Sept. 17, 1963  R. F. VETTER ETAL  3,103,784
PLASTIC INTERNAL ROCKET NOZZLE
Filed Nov. 15, 1960
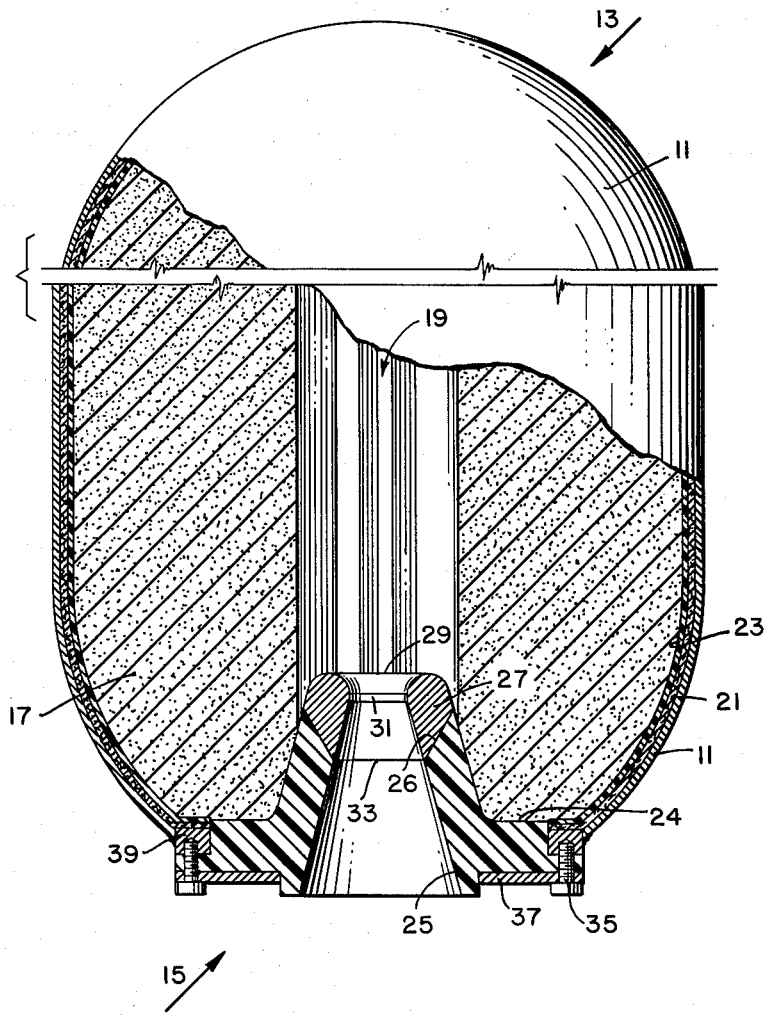
INVENTORS.
RONALD F. VETTER
RAY A. MILLER
STEPHEN H. HERZOG
BY
*P. H. Firsht*
ATTORNEY.

3,103,784
PLASTIC INTERNAL ROCKET NOZZLE
Ronald F. Vetter, Ray A. Miller, and Stephen H. Herzog, China Lake, Calif., assignors to the United States of America as represented by the Secretary of the Navy
Filed Nov. 15, 1960, Ser. No. 69,529
6 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates generally to improvements in internal rocket nozzles and more particularly to a new and improved plastic internal rocket nozzle for a composite propellant system which may be bonded directly to a composite propellant grain, the structure of which reduces or practically eliminates thermal stress to the nozzle closure.

In the field of rocketry it has been the practice to fabricate internal nozzles of graphite and metal which could not be bonded directly to the cast composite propellant grain because of the high heat transfer rate through the graphite and metal. The graphite and steel internal nozzles are sometimes very fragile and must be handled with extreme care; furthermore, the fabrication of the graphite and steel nozzles is a long and costly process. Although these nozzles have served the purpose, they have not proved entirely satisfactory under all conditions of service for the reasons that considerable difficulty has been experienced at high temperatures requiring elaborate gas sealing systems and special precautions must be taken to insure that the rocket engine can withstand the high temperature and quantity of heat transferred without malfunction.

The general purpose of this invention is to provide an internal plastic nozzle for composite propellant systems which embraces all the advantages of similarly employed rocket nozzles and possesses none of the aforedescribed disadvantages. To attain this, the present invention contemplates an internal nozzle comprising a heat-resistant resin molded under extreme pressure and temperatures to which nozzle inserts made of graphite or other suitable material are attached whereby the composite propellant grain is bonded directly to the nozzle thereby giving higher motor loading density and increasing resistance to mechanical shock.

An object of the present invention is to provide a plastic nozzle which permits the composite propellant grain to be bonded directly to the rocket nozzle.

Another object is to provide an internal rocket nozzle structure which is light in weight.

A further object of the invention is the provision of an internal rocket nozzle structure which is resistant to thermal shock and eliminates or greatly reduces the thermal load on the nozzle closure.

Still another object is to provide a plastic internal rocket nozzle which can be mass fabricated simply and cheaply.

Other objects and features of this invention will become apparent to those skilled in the art as the disclosure is made in the following detailed description when considered in connection with the accompanying drawing in which like reference numerals designate like parts throughout the figures thereof.

In the accompanying drawing which illustrates an embodiment of the present invention, the single FIGURE is a partial longitudinal section through the rocket motor casing and associated parts thereof disclosing the nozzle end of the motor in which a composite propellant grain is cast in place.

Referring more particularly to the accompanying drawing, the rocket motor structure shown comprises a heat-resistant casing or combustion chamber 11, which may be of a generally cylindrical, spherical, or sphericocylindrical cross-section, closed at its forward or head end, designated generally by numeral 13, and fitted at its aft end with an internal nozzle designated generally by numeral 15. A composite propellant grain or charge 17, is introduced into chamber 11 through the head end and allowed to solidify around a longitudinally extending core (not shown) to form a central perforation 19 which in the embodiment illustrated is multi-star shaped, but may be of any other suitable cross-section. The composite propellant grain comprises an oxidizer and fuel, with the oxidizer an inorganic salt and the fuel an organic plastic, resin, or elastomeric material. A liner 21 of a heat-insulating material, as, for example, asbestos and a suitable resin binder, is molded to follow along the inner surface or contour of chamber or casing 11. An inhibiting material 23, composed of a nonburning material applied, generally by spraying, provides a good surface to which the propellant can be bonded. An internal nozzle designated generally by numeral 15 is positioned in the aft end of rocket chamber 11 and comprises a single-port plastic exit cone 25 the wall of which converges to form an area of restricted diameter, designated as apex surface or section 26, the outside walls of the cone being bonded directly to composite propellant grain 17, and a preformed inlet cone or insert 27 pressed or bonded to surface 26 of cone 25. Insert 27 comprises a hollow inlet cone portion or section designated by numeral 29, a throat portion or section 31 and an exit cone portion or section 33 having a surface which corresponds to the apex surface 26 of plastic cone 25.

It is to be noted that apex surface 26 of cone 25 is frusto-conical and that the corresponding surface on section 33 of insert 27 is in face-to-face relation and mates therewith. Such a structural arrangement serves two purposes: (1) pressure of the rocket gases forces the aforesaid surfaces into tighter engagement, thus requiring only a light bond therebetween, and (2) a greater area of plastic is provided to which the propellant may be bonded, thus increasing loading density.

Exit cone 25 was block-molded and machined from a heat-stable thermosetting material, such as phenolic resin-asbestos filler, to form a conical nozzle with a flange or shoulder 24, which if cut through at any point perpendicular to the nozzle axis, the exposed area is circular. These types of materials are well known to those skilled in the art and could be, if desired, of the type disclosed in Ward U.S. Patent No. 2,835,107, or any like material suitable for the purpose.

Insert 27 may be made of graphite, tungsten, molybdenum, tantalum, or other suitable refractory material. Graphite is shown in the embodiment herein illustrated.

The internal nozzle designated generally by numeral 15 is firmly attached to motor casing 11 by bolts 35, extending through holes in shoulder 24 and steel retainer ring 37. The bolts are threaded into a flange 39, welded or otherwise attached to the motor casing, whereby the nozzle shoulder is held securely thereto.

The internal plastic nozzle of this invention has been test fired many times and proved superior to the metal-graphite and other nozzle designs heretofore used.

When the heat-resistant nozzle composed of the asbestos-filled thermosetting phenolic resin or other like material is molded directly into the motor shell or casing, the metal retaining ring is no longer required.

The present internal plastic nozzle for a composite propellant system may be fabricated of any heat-resistant thermosetting type resin containing a filler. The fillers are usually powders of metals, metal oxides, or ceramics, fibers of asbestos, glass, refrasil and graphite. Nozzles made from formulations containing powder or non-oriented fibers are usually molded to shape. Those made from laminates or oriented fibers are usually machined from a block of molded material. When oriented fibers are used, the block is machined in such a manner that the fibers are oriented in a direction perpendicular to the flow of rocket exhaust gases. The graphite insert withstands high temperatures and nozzle-throat erosion has been held to a minimum, thereby reducing motor malfunction.

Nozzles for rockets have undergone many design changes as the requirements and rocket motor firing conditions become more severe. With the constant need for reduction in weight it has been necessary to make the body of the nozzle as thin and strong as possible. The use of copper or steel nozzles with graphite or molybdenum inserts has been highly effective with the homogeneous propellants, but has not been satisfactory with the composite propellants due to their higher-burning temperatures and erosive exhausts. The present invention utilizing a heat-stable plastic nozzle with graphite inserts has proved successful in the composite propellant system. Furthermore, the phenolic asbestos utilized in fabrication of the present invention bonds directly to the composite grain thereby permitting higher motor loading density and consequently producing higher performance rocket motors. Copper or steel nozzles used heretofore do not bond directly to the composite grain, and they are extremely heavy since the nozzle portion which is not protected by graphite must be extra heavy to provide a reservoir for the heat. The nozzle of the present invention has been designed to reduce the erosion and wear on the nozzle produced by hot, high velocity gases.

The present heat-stable structure comprising phenolic asbestos with insert can be press-molded directly into the aft section of the rocket motor before or after attachment (by riveting, threading, bonding, etc.) to the motor tube. The machining, and the separate bonding step are thereby eliminated and the cost of fabrication greatly reduced. The steel retaining ring is also eliminated.

The internal plastic nozzle when used in conjunction with a foam core or mandrel will eliminate the head closure except for a very small entry port thereby producing an ultra light weight unit.

The present internal plastic nozzle for composite propellants permits the propellant to be head-end cast in the motor casing. If the nozzle is first provided with an effective closure (core, mandrel disc or other type seal), the propellant can be cast and bonded directly to the phenolic-asbestos portion of the nozzle, thus increasing the loading density and greatly reducing the amount of erosion protection required at the aft end of the motor. The steel motor casing also can be made lighter by means of minor design changes, because practically no heat is transferred to the steel through the plastic nozzle during firing.

Obviously many modifications and variations of the present invention are possible in the light of the above teachings. It is therefore to be understood that within the scope of the appended claims, the invention may be practiced otherwise than as specifically described.

What is claimed is:

1. In combination with a rocket motor having a combustion chamber,
   a composite propellant grain within the chamber,
   a single-port heat-stable thermosetting plastic internal nozzle having an inlet portion and an exit portion with inner and outer walls, the outer walls thereof positioned adjacent to said grain and in a sealing relation thereto,
   said nozzle having an insert comprising
   an inlet section,
   a throat section, and
   an exit section positioned in contiguous relation with the inlet section of said plastic nozzle and in a sealing relation thereto.

2. In combination with a rocket motor having a casing and a combustion chamber,
   a composite propellant charge within the chamber,
   an internal nozzle having a conical passage extending therethrough, the walls of said passage composed of a heat-stable thermosetting plastic material situated adjacent said propellant charge and converging to form a restricted apex portion,
   a graphite insert comprising
   an inlet portion,
   a throat and
   an exit section, said insert exit section positioned contiguous with said apex portion and in a sealing relation thereto,
   said nozzle having a shoulder at its exit section seated against the interior wall of the rocket motor casing and secured by a steel retaining ring.

3. A rocket motor comprising
   a metal casing,
   a composite propellant grain positioned within the casing,
   an internal nozzle comprising
   an exit cone,
   a throat and
   an inlet cone;
   said exit cone composed of asbestos-filled thermosetting phenolic resin material converging to form an area of restricted diameter and having inner and outer walls;
   the walls of the throat and inlet cone composed of graphite which are situated in a constraining contactual relation with the restricted diameter of the exit cone;
   the outer walls of said exit cone positioned in a sealing relation with the propellant grain and secured to the aft end of said rocket motor.

4. In combination, a rocket motor comprising
   a metal casing,
   an internal nozzle extending into said casing and secured thereto, and
   a composite propellant grain positioned within the casing, said nozzle comprising
   a frusto-conical exit portion of asbestos-filled thermosetting phenolic resin material having inner and outer walls and
   a frusto-conical insert portion of graphite having an inlet,
   a throat and an outlet,
   said exit and insert portions each having a frusto-conical surface in face-to-face mating relation,
   said outlet of the insert portion having a wall which a continuation of the inner wall of the exit portion, and
   said composite propellant grain positioned in abutment with the outer walls of said exit portion and in a bonding relation thereto.

5. In combination, a rocket motor, comprising
   a casing,
   a composite internal perforation propellant grain positioned within said casing,
   a nozzle extending into the perforation of said grain with the major portion of the nozzle disposed within said casing, said nozzle comprising
   an exit portion of asbestos-filled thermosetting phenolic resin material secured to said casing and
   a graphite insert throat portion secured to said exit portion,
   said exit portion having inner and outer walls joined by a frusto-conical surface therebetween,
   said insert portion having a frusto-conical surface,
   said frusto-conical surfaces of said insert and exit portions being in face-to-face mating relation, and said grain positioned in abutment with said outer wall of said exit portion.

6. In combination, a rocket motor comprising
a casing,
a circular ring secured to said casing at the rear end thereof, said ring defining a circular opening,
a nozzle disposed within said opening and entending into said casing, said nozzle comprising
an exit portion of asbestos-filled thermosetting phenolic resin material and
a graphite insert throat portion secured to said exit portion,
said exit portion having frusto-conical inner and outer walls joined by a frusto-conical surface therebetween and a flange extending laterally from the rear edge of the outer wall, said flange being secured to said ring,
said insert portion having a frusto-conical surface in face-to-face mating relation with the frusto-conical surface of said exit portion, and
a composite propellant grain positioned within said casing; said grain positioned in contiguous relation with said flange and outer wall.

References Cited in the file of this patent

UNITED STATES PATENTS

| | | |
|---|---|---|
| 1,879,579 | Stolfa et al. | Sept. 27, 1932 |
| 2,835,107 | Ward | May 20, 1958 |
| 2,958,184 | Sanders | Nov. 1, 1960 |
| 2,972,859 | Porcher | Feb. 28, 1961 |
| 2,987,880 | Kimmel | June 13, 1961 |
| 2,995,011 | Kimmel | Aug. 8, 1961 |
| 3,017,744 | Jett | Jan. 13, 1962 |
| 3,032,975 | Alden | May 8, 1962 |
| 3,048,970 | Herzog | Aug. 14, 1962 |
| 3,064,423 | Frey | Nov. 20, 1962 |

FOREIGN PATENTS

| | | |
|---|---|---|
| 608,242 | Germany | Jan. 21, 1935 |
| 599,275 | Great Britain | Mar. 9, 1948 |
| 757,890 | Great Britain | Sept. 26, 1956 |